US012795421B2

(12) United States Patent
Silverman et al.

(10) Patent No.: US 12,795,421 B2
(45) Date of Patent: Nov. 10, 2026

(54) RATE ADAPTATION AND POWER STRUCTURE FOR COMMUNICATING WI-FI PEERS

(71) Applicant: Cisco Technology, Inc., San Jose, CA (US)

(72) Inventors: Matthew A. Silverman, Shaker Heights, OH (US); John M. Swartz, Lithia, FL (US); Robert E. Barton, Richmond (CA); Jerome Henry, Pittsboro, NC (US); Malcolm M. Smith, Richardson, TX (US)

(73) Assignee: Cisco Technology, Inc., San Jose, CA (US)

( * ) Notice: Subject to any disclaimer, the term of this patent is extended or adjusted under 35 U.S.C. 154(b) by 643 days.

(21) Appl. No.: 18/192,395

(22) Filed: Mar. 29, 2023

(65) Prior Publication Data

US 2024/0163703 A1 May 16, 2024

Related U.S. Application Data

(60) Provisional application No. 63/383,431, filed on Nov. 11, 2022.

(51) Int. Cl.
*H04W 24/10* (2009.01)
*H04B 17/336* (2015.01)

(52) U.S. Cl.
CPC .......... *H04W 24/10* (2013.01); *H04B 17/336* (2015.01)

(58) Field of Classification Search
CPC ............................. H04W 24/10; H04B 17/336
See application file for complete search history.

(56) References Cited

U.S. PATENT DOCUMENTS

| | | | | |
|---|---|---|---|---|
| 10,993,243 | B1 | 4/2021 | Zhang et al. | |
| 2014/0341098 | A1 | 11/2014 | Cho et al. | |
| 2018/0205442 | A1 | 7/2018 | Oteri et al. | |
| 2019/0342064 | A1* | 11/2019 | Tian | H04L 5/1423 |
| 2020/0008210 | A1 | 1/2020 | Li et al. | |
| 2021/0235486 | A1* | 7/2021 | Atefi | H04W 74/002 |
| 2022/0061062 | A1 | 2/2022 | Min et al. | |
| 2024/0357653 | A1* | 10/2024 | Luo | H04W 74/0816 |

FOREIGN PATENT DOCUMENTS

WO 2021239618 A2 12/2021

OTHER PUBLICATIONS

U.S. Appl. No. 18/162,554 entitled "Concurrent Peer-To-Peer Transmissions Via Interference Alignment" filed Jan. 31, 2023.

* cited by examiner

*Primary Examiner* — Chuong A Ngo
(74) *Attorney, Agent, or Firm* — Patterson + Sheridan, LLP

(57) ABSTRACT

Embodiments herein describe assigning RUs to P2P stations to perform P2P communication. An AP can assign trigger frames to assign RUs to STAs to use when transmitting data to the AP. In one embodiment, the AP polls the P2P STAs associated with it to receive interference data. This data can indicate the affect other peer STAs have on the P2P STAs when transmitting data. Using the interference data, the AP can determine whether another P2P pair or a non-P2P station can be assigned RUs to transmit at the same time, and at what data rates.

18 Claims, 4 Drawing Sheets

RATE ADAPTATION AND POWER STRUCTURE FOR COMMUNICATING WI-FI PEERS

CROSS-REFERENCE TO RELATED APPLICATIONS

This application claims benefit of co-pending U.S. provisional patent application Ser. No. 63/383,431 filed Nov. 11, 2022. The aforementioned related patent application is herein incorporated by reference in its entirety.

TECHNICAL FIELD

Embodiments presented in this disclosure generally relate to managing peer-to-peer (P2P) communication using an access point (AP).

BACKGROUND

WiFi 8 is expected to provide a P2P mechanism. This can more generally be viewed as a basic service set (BSS) allocating resources to some other devices to directly communicate with each other without requiring uplink/downlink from the BSS provided by the AP. In Wi-Fi 7, P2P support is limited to allocating timeslots (TXOP) for a P2P station (STA) within e.g., a multi-user, trigger-based physical layer protocol data unit (MU TB-PPDU).

There are several issues related to time synchronization and transmit (Tx) power management that should be controlled for P2P communication to have satisfactory performance. For example, in an exchange that includes an multi-user orthogonal frequency-division multiple access (MU OFDMA) transmission, the AP should ensure that the receiving P2P device can receive the intended P2P transmission at an receive (Rx) power that is relatively high compared to other transmitting devices in the same MU OFDMA frame.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate typical embodiments and are therefore not to be considered limiting; other equally effective embodiments are contemplated.

To facilitate understanding, identical reference numerals have been used, where possible, to designate identical elements that are common to the figures. It is contemplated that elements disclosed in one embodiment may be beneficially used in other embodiments without specific recitation.

DESCRIPTION OF EXAMPLE EMBODIMENTS

Overview

Figure 1:
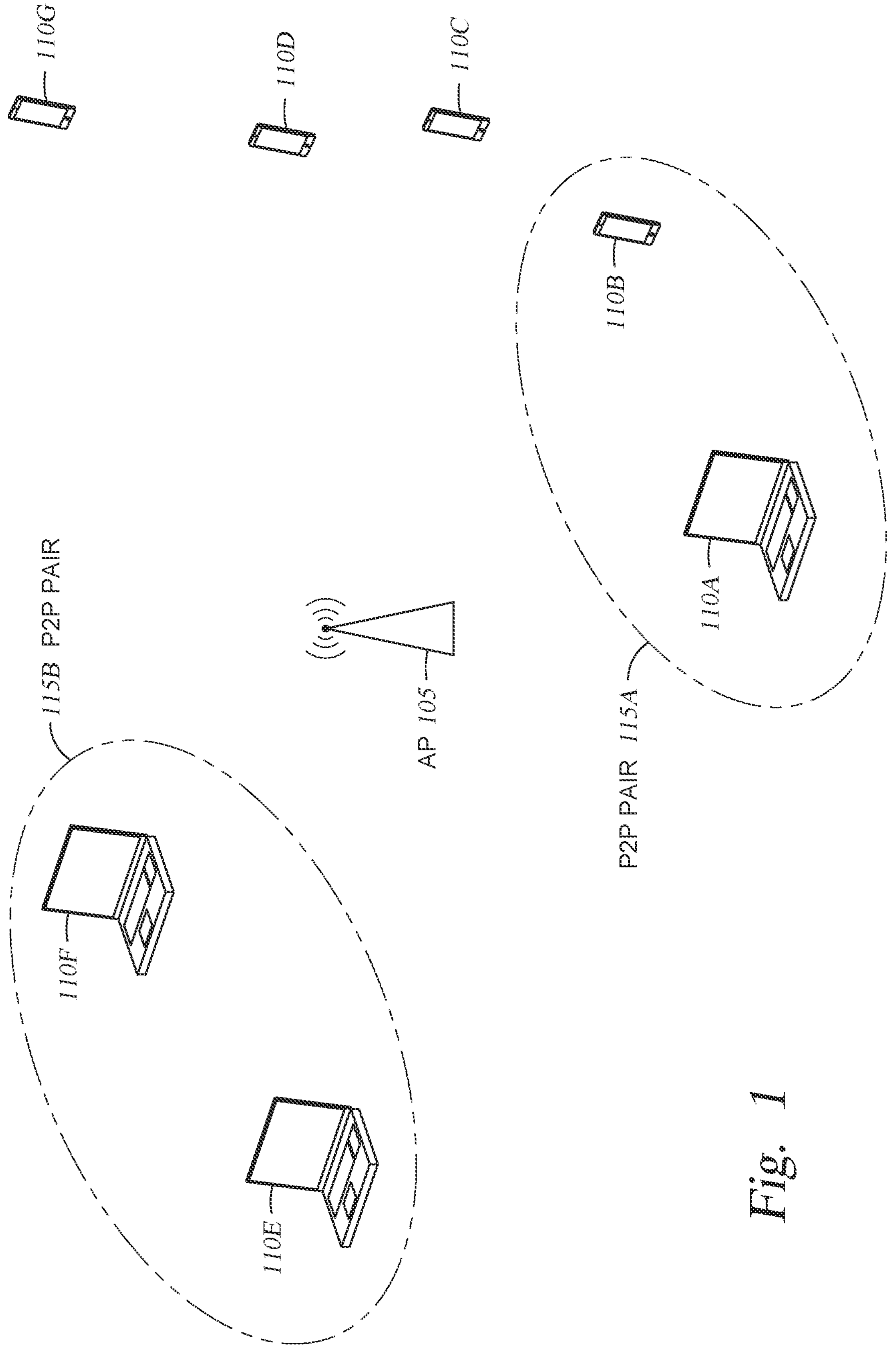
FIG. 1 illustrates P2P STAs and non-P2P STAs associated with an AP, according to one embodiment.

Embodiments presented in this disclosure is a method, access point (AP), and computer readable medium that includes polling a peer-to-peer (P2P) station associated with the AP; receiving, in response to the polling, interference data from the P2P station indicating an amount of interference received at the P2P station caused by at least one other station associated with the AP; assigning a resource unit (RU) to the P2P station to perform P2P communication; and transmitting a trigger frame from the AP to the P2P station, the trigger frame comprising the RU and an indication of a data rate the P2P station should use when communicating during the RU where the data rate is based on the interference data.

EXAMPLE EMBODIMENTS

Embodiments herein describe assigning resource units (RUs) to P2P STAs (e.g., P2P client devices) to perform P2P communication. An AP can use trigger frames (e.g., IEEE 802.11ax trigger frames) to assign RUs to STAs for use when transmitting data to the AP. In addition, the AP can assign some or all of these RUs to P2P STAs to communicate with each other (i.e., perform P2P communication). However, there are challenges with assigning RUs to multiple P2P pairs and non-P2P STAs (e.g., a STA that is incapable, or is currently not performing P2P). First, for satisfactory OFMDA communication, the power levels associated with the RUs should be balanced. When the STAs are transmitting to the AP, this is an easier task since the AP can balance the power levels so a similar received signal strength indication (RSSI) is seen by the AP for each of the STAs transmitting data. However, for P2P communication, the AP does not have insight on how the transmission by one STA can affect the STAs performing P2P communication. One solution is to permit only one P2P pair to communicate, but this wastes RUs that could be assigned to non-P2P STAs or other P2P STAs that could transmitted data to the AP without substantially affecting the P2P pair.

In one embodiment, the AP polls the P2P STAs associated with it to receive interference data. This data can indicate the affect other peer STAs have on the P2P STAs when transmitting data. For example, the interference data can indicate that a non-P2P STA is close (or is "loud") relative to a P2P STA. In response, when assigning a RU to that P2P STA to receive data from another P2P STA, the AP may not assign a RU to the neighboring non-P2P STA. Alternatively, the AP may select a lower data rate for P2P communication so that the P2P STA can successfully receive the P2P data despite the non-P2P STA transmitting data to the AP at the same time. In this manner, the amount of interference indicated by interference data can be used to set a data rate corresponding to the P2P communication so that the P2P communication can occur in parallel with the non-P2P communication.

In addition, the trigger frame used to assign RUs for P2P communication can also synchronize clocks on the P2P STAs. This prevents local oscillators on the P2P STAs from drifting, which can cause the P2P STAs to user frequencies that may overlap the frequencies used by other RUs. In one embodiment, the P2P STAs can lock to the trigger frame and use that for the OFDMA frame they send to each other.

FIG. 1 illustrates P2P STAs and non-P2P STAs associated with an AP 105, according to one embodiment. In this example, the P2P STAs include STAs 110A, 1108, 110E, and 110F. These STAs form two pairs of P2P STAs—i.e., P2P pair 115A and 115B. The non-P2P STAs include STAs 110C, 110D, and 110G. Further, while in some embodiments, the non-P2P STAs may be incapable of P2P communication, in other embodiments, the non-P2P STAs may be P2P capable, but currently are not performing P2P communication. Moreover, while the P2P STAs are currently requesting RUs from the AP 105 to perform P2P communication, at other times these STAs may function as traditional STAs and send traffic to the AP 105 rather to a companion P2P STA.

The STAs 110A-G can be any client device (e.g., mobile phone, laptop, desktop, tablet, etc.) that can associate with the AP 105. In this example, the P2P STAs have data they wish to transmit to each other, while the non-P2P STAs have data that should be transmitted to the AP 105. Using the embodiments below, the AP 105 can assign RUs to both the P2P STAs (e.g., multiple pairs of P2P STAs) and the non-P2P STA to transmit data in parallel.

Figure 2:
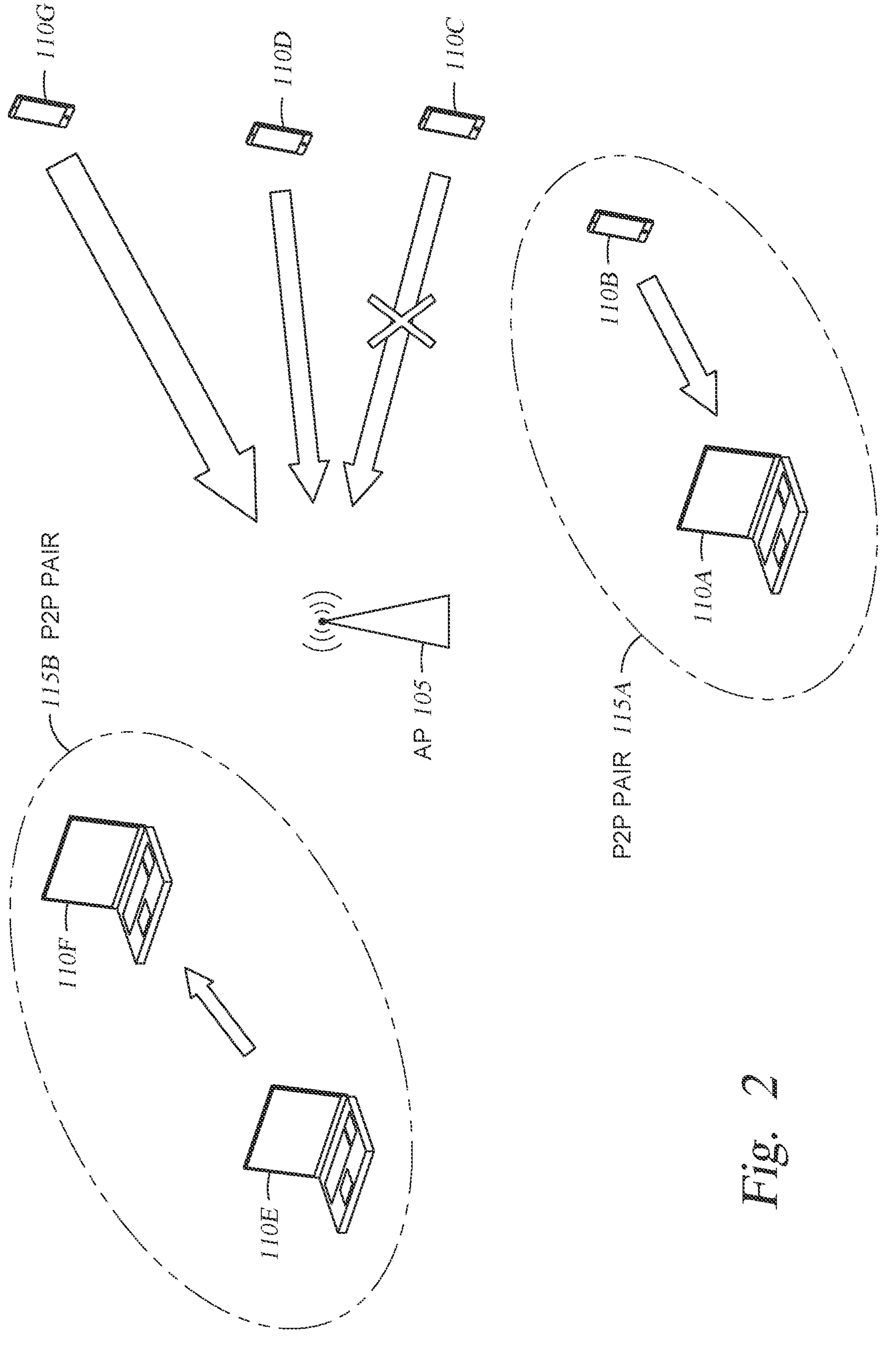
FIG. 2 illustrates P2P communication and non-P2P communication occurring in parallel, according to one embodiment.

FIG. 2 illustrates P2P communication and non-P2P communication occurring in parallel, according to one embodiment. That is, FIG. 2 illustrates using the techniques that are discussed in more detail below to assign RUs for P2P communication and RUs for non-P2P communication between the STAs and the AP 105.

Figure 3:
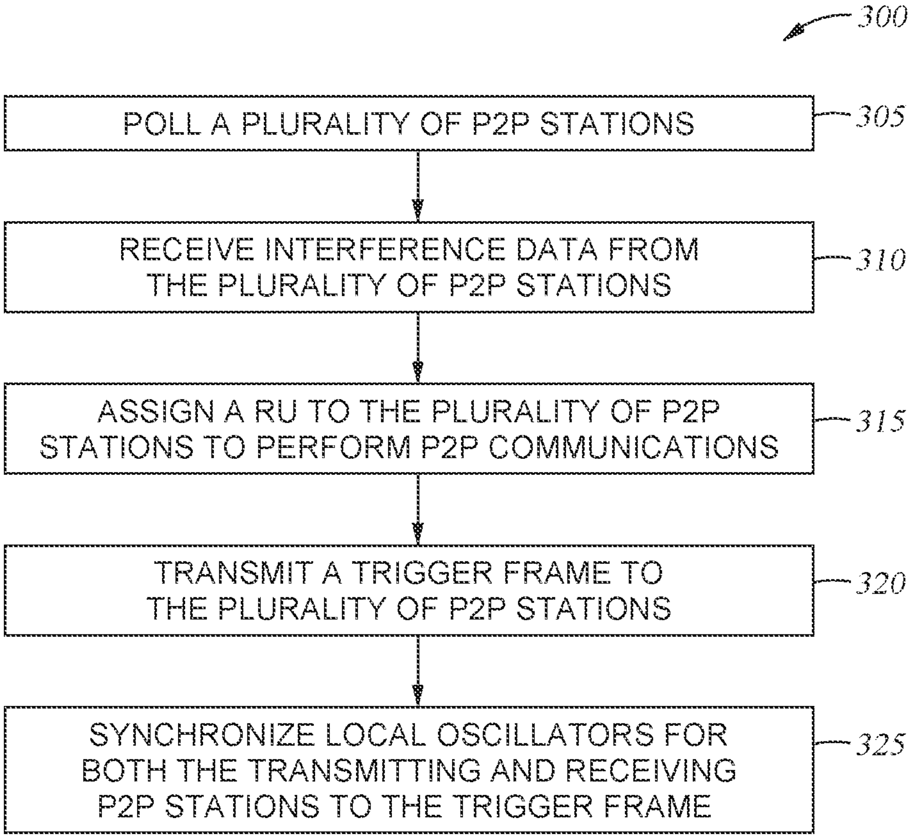
FIG. 3 is a flowchart for enabling P2P communication using an AP, according to one embodiment.

In this example, the AP 105 has assigned a RU to the P2P pair 115A and a RU to the P2P pair 1158. Thus, in parallel, one of the P2P STAs in the pairs 115A and 1158 can transmit to the other P2P STA. Moreover, the data rate used by the transmitting P2P STAs can be set by the trigger frame sent from the AP 105 to assign the RUs. FIG. 3 will discuss different techniques for determining the data rate that is assigned to the P2P pairs 115.

In addition, FIG. 2 illustrates assigning RUs to non-P2P STAs to transmit data to the AP 105 in parallel with the P2P pairs 115 performing P2P communication. In this case, the STA 110C is not assigned a RU, and thus, does not transmit data to the AP 105. For example, when polling the P2P STAs, the AP 105 may have learned that, when transmitting, the STA 110C has a severe detrimental effect on the RSSI of the STA 1108 and the STA 110A. Thus, if the STA 110C was permitted to transmit at the same time the P2P pair 115A performs P2P communication, the STAs 110A and 1108 may be unable to successfully transmit data to each other. As such, the AP 105 may not assign a RU to the STA 110C. Instead, the AP 105 may send a different trigger frame during a later time period that permits the STA 110C to transmit data during a time when the P2P pair 115A is not performing P2P communication.

In contrast, the STAs 110D and 110G are permitted to communicate with the AP 105 at the same time the P2P pairs 115 perform P2P communication. That is, in the same trigger frame, the AP 105 can assign RUs to the P2P STAs in the P2P pairs 115 and to the STAs 110D and 110G. Notably, the arrow between the STA 110D and the AP 105 is thinner than the arrow between the STA 110G and the AP 105. This represents the different interference the STAs 110D and 110G have on the STAs in the P2P pairs 115. As shown, the STA 110D is closer to the STAs 110A and 110B than the STA 110G. Thus, the transmission by the STA 110D may have a greater effect on the RSSI of the STAs 110A and 110B than the STA 110G. In response, the AP 105 may lower the data rate used by the STAs 110A and 110B when performing P2P communication so that this communication can occur successfully despite any interference introduced by the STA 110D. For instance, the AP 105 may instruct the STA 110B to use a lower data rate (e.g., an adjusted modulation coding scheme (MCS)) when transmitting data to the STA 110A during the RU. In general, lowering the data rate makes the P2P communication more tolerant to interference from other transmission, whether those transmission are from non-P2P STAs or other P2P STAs. While the present embodiments describe adjusting the data rate of the P2P communication in response to interference from non-P2P STAs (or other pairs of P2P STAs), the AP 105 may adjust the power levels of the interfering non-P2P STAs. For example, in the trigger frame, the AP 105 may indicate a power level to the STA 110D it should use when transmitting data during the assigned RU so that the interference caused the by STA 110D at the STAs 110A and 110B is reduced.

Based on the interference data received from the P2P STAs, the AP 105 may determine that the STA 110G has little to no effect on the P2P STAs. Thus, the AP 105 may not have to reduce the data rate used by the P2P pairs 115 due to interference from the STA 110G. Further, the AP 105 may not put any restrictions on the STA 110G when it transmits data to the AP 105 (e.g., not have to reduce its power level) Thus, by evaluating the interference data provided by polling the STAs 110A, 110B, 110E, and 110F, the AP 105 can determine that their data rates should not be reduced because of the STA 110G (although they may be reduced in response to the interference caused by the STA 110D).

In sum, FIG. 2 illustrates using interference data generated by polling the P2P STAs to determine interference caused by peer STAs, and then assigning RUs and data rates to P2P communication so that data can be transmitted successfully despite interference from non-P2P or other P2P communications.

FIG. 3 is a flowchart of a method 300 for enabling P2P communication using an AP, according to one embodiment. At block 305, the AP polls a plurality of P2P STAs. In one embodiment, the AP transmits a request for interference data from the P2P STAs. The P2P STAs can respond to this request with RSSIs of the set of STAs that it heard with a receive address (RA) that is in the same BSS of the polling AP. From this interference data, the AP can determine the effect that other peer STAs in the same BSS have on the P2P STAs.

In one embodiment, the AP can use a specific scan time for a P2P STA to perform the polling that does not conflict with any P2P TXOPs scheduled for it or for the P2P STA's companion.

In another embodiment, the AP polls only one P2P STA in a P2P pair. For example, while in some implementations both of the P2P STAs in a P2P pair may be associated with the AP, in other embodiments, only one of the P2P STAs in the pair may be associated with the AP (referred to as a "soft" AP). For example, one P2P STA may be a client device that is compatible with the AP 105 while the other P2P STA in the pair is an unmanaged endpoint (e.g., a head mounted display that is paired with a phone that is associated with the AP 105). This companion unmanaged device may not allow link level control of the P2P STA. Nonetheless, the AP 105 can delegate the responsibility of retrieving the interference data to the managed device which can then coordinate with the companion unmanaged device. For example, the AP 105 may poll the managed P2P STA which in turn receives interference data from the unmanaged P2P STA. The managed P2P STA can then provide interference data for both itself and the unmanaged P2P STA to the AP 105. In this manner, both of the P2P STAs in the P2P pair do not have to be associated with the AP. Stated differently, one of the P2P STAs may not directly communicate with the AP.

In one embodiment, the AP polls STAs that identify as being P2P capable, even if those devices are not currently requesting to perform P2P communication. For example, the STAs may self-identify to the AP as P2P capable STAs, in which case the AP can polls those devices. Or the AP may identify the P2P STAs by the STAs telling the AP what kind of traffic it wants to send. If a STA wants to transmit P2P traffic, then the AP knows the STA is a P2P STA, and in response, performs block 305.

Because the STAs may be mobile, the AP may intermittently repeat the polling performed at block 305.

In one embodiment, the AP also performs a requirement poll for the P2P STAs. This poll can tell the AP the limits or parameters on adjusting the data rates used to perform P2P communication. For example, the P2P STA can respond with the signal-to-noise-ratio (SNR) required to decode a set of MCS rates. This allows the AP to identify any limitation on the hardware in the P2P STA. In one embodiment, this information permits the AP to generate a map illustrating how RSSI and data rates are related.

At block 310, the AP receives interference data from the plurality of P2P STAs that were polled at block 305. In one embodiment, the interference data includes an RSSI which indicates an effect neighboring STAs (whether those STAs are P2P or non-P2P STAs) have on the ability of the STA being polled to receive data. In one embodiment, the interference data includes the RSSIs of the set of STAs that is in the same BSS of the polling AP.

At block 315, the AP assigns a RU to the plurality of P2P STAs to perform P2P communications. A RU is a unit in OFDMA terminology to identify a group of bandwidth subcarriers (e.g., tones) that can be used in DownLink (DL) and UpLink (UL) transmissions. In one embodiment, the RU indicates a time duration and a particular frequency range or bandwidth (e.g., a channel in a spectrum) that the P2P STAs can use to perform P2P communication. Moreover, the AP can assign RUs to multiple P2P STAs. For example, assuming the interference data indicates simultaneously P2P communication can occur, the AP can provide a first RU to a first P2P pair and a second RU to a second P2P pair so these pairs can perform P2P communication in parallel using their respective RUs. This is shown in FIG. 2 where the P2P pairs 115A and 115B are provided respective RUs so they can perform P2P communication in parallel.

Moreover, the AP can assign RUs to non-P2P STAs to perform non-P2P communication, such as a STA transmitting data to the AP. The AP can also consider the interference data when decided whether to permit non-P2P communication to occur at the same time as P2P communication. Again referring to FIG. 2, in that example the STA 110C generates too much interference for the P2P pair 115A, and thus, is not assigned a RU. As such, the STA 110C does not transmit at the same time as the P2P communication. Thus, in this manner, the interference data can be used to determine which P2P STAs and which non-P2P STAs are assigned RUs to transmit in parallel. Assigning RUs to non-P2P STAs is discussed in more detail in FIG. 4.

In one embodiment, the AP assigns a group ID to each P2P pair. When allocating a RU to a P2P pair, the AP can identify the STAs as a group rather than specifying, for example, entire MAC addresses. The group ID can be used instead of an association ID (AID) in the trigger frame (i.e., the AID is replaced by the group ID). The peers in the group (a P2P pair) would already be informed of their group ID before being assigned the RU.

While block 315 is described as being performed by the AP, in other embodiments, a different network device (e.g., a network controller) may evaluate the interference data received from the STAs and assign the RUs. Further, a network controller (or some other computing system) may also set the data rate used by the P2P STAs, rather than the AP making this determination.

At block 320, the AP transmits a trigger frame to the plurality of RUs with the assigned RU. In one embodiment, the trigger frame is a IEEE 802.11ax trigger frame. Moreover, the trigger frame can include RUs assigned to multiple pairs of P2P STAs, as well as any RUs assigned to non-P2P STAs. Thus, in one embodiment, the same trigger frame can be used to assign RUs for both P2P and non-P2P communication.

In addition to the RUs, the trigger frame can indicate a data rate the transmitting P2P STA should use when transmitting during the assigned RU. This data rate can be based on the interference data received in response to the polling at block 305. For example, if the AP learns that a P2P pair is substantially unaffected by peer STAs, the trigger frame may indicate that the highest data rate (e.g., the fastest MSC) can be used. However, if the AP learns from the interference data that there is some interference caused by the neighboring STAs, the AP can instruct the transmitting P2P STA to use a lower data rate. While the AP could have simply instructed the interfering STAs not to transmit while P2P communication was occurring (thereby permitting the P2P pair to use the highest data rate), this may be more inefficient than reducing the data rate of the P2P pair so that the interfering P2P STAs can also be assigned a RU and transmit in parallel. An example of this is shown in FIG. 2 where the STA 110D is still permitted to transmit even though it causes interference at the P2P pair 115A, which may use a lower data rate so the P2P communication is more tolerant to the interference.

The AP may perform a similar evaluation of interference caused by neighboring P2P STAs. Again referring to FIG. 2, the transmitting P2P STAs in the P2P pairs 115A and 1158 may interfere with the other P2P pair. Rather than permitting only one P2P pair to transmit at a given time, by reducing the data rate used by the P2P pairs 115, both P2P pairs 115 may be able to transmit in parallel. It may be more efficient for both P2P pairs to transmit data at reduced data rates than only one P2P pair to transmit at the highest data rate. In this manner, the method 400 permits a more efficient use of the wireless medium by permitting more RUs to be used, whether for multiple pairs of P2P devices to transmit in parallel and/or for P2P devices to transmit in parallel with non-P2P devices.

To convey the data rate to the P2P STAs, the trigger frame can directly indicate the data rate that should be used (e.g., indicate the MCS that the P2P Tx should use). Alternatively, the trigger frame can indirectly convey the data rate to the P2P STAs (e.g., indicate the max RSSI that the P2P receiver will hear one of the other devices or indicate the max SNR that can be achieved given the other OFDMA devices in the UL PPDU and the previous polling). From this information, the P2P STAs can then determine the MCS that should be used when transmitting data.

In one embodiment, there can be a field added in a Ultra-High Reliability (UHR) signal A (i.e., UHR-SIG-A) that indicates the RU resourcing (as per WiFi7), the group ID, and/or a proxy AID (USER_INFO). Further, the UHR trigger frame can include a UHR-SIG-B that indicates the direction of flow of the P2P communication—i.e., which of the P2P STAs in a P2P pair is permitted to transmit and which receives data during the RU.

At block 325, the transmitting and receiving P2P STAs in a P2P pair synchronize their local oscillators to the trigger frame. P2P communication is not tolerant of big offsets.

Currently, there is no technique for a P2P STA to adopt the clock of the AP. In block 325, the P2P STAs can lock to the trigger frame and use that for the OFDMA frame they send to each other. This can prevent the P2P communication from bleeding into frequency ranges of neighboring RUs (e.g., prevent collisions between the carriers in neighboring RUs).

For successful P2P communication, the P2P receivers should receive their P2P companion at an RSSI that provides an SNR relative to the quantization noise driven by the Rx power of other OFDMA transmitters. In an OFDMA MU uplink (UL), this means for a managed P2P STA the AP knows the Rx RSSI that the P2P receiver hears peer devices that could transmit during the P2P exchange and the intended data rate of the P2P transmitter. From the RSSI and data rate information, the AP can schedule devices to transmit during the high-efficiency (HE) trigger based (TB) PPDU (i.e., HE-TB PPDU) that the P2P receiver hears at a level that would not violate the SNR requirements for that intended data rate. For example, the P2P STA endpoint could share its current MCS/RSSI targets with the AP directly (if supported) or these targets could be sent to the AP via its proxy/companion P2P STA (e.g., the soft AP).

For unmanaged P2P STAs, the AP could share with the P2P STA directly (or via the proxy) information (e.g., post-FFT noise density) that allows the P2P transmitter to select the data rate it could send that would have adequate SNR to decode the data given the devices that are included in the UHR-TB PPDU. In one embodiment, this may be done through a control message sent from the AP.

Figure 4:
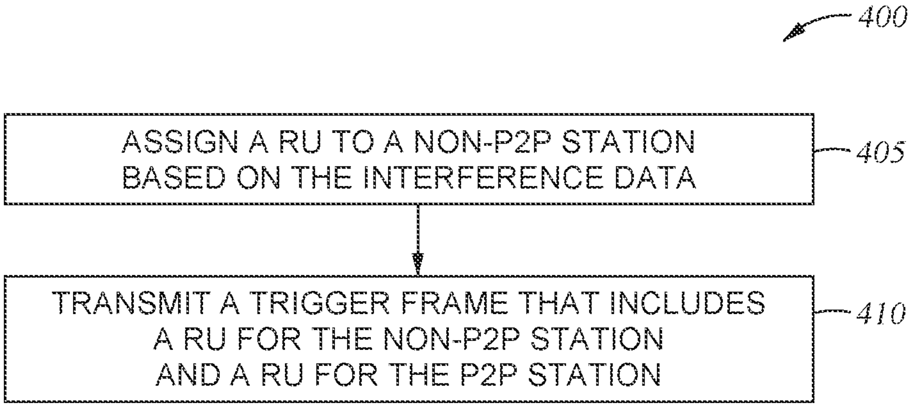
FIG. 4 is a flowchart for enabling non-P2P communication to occur in parallel with P2P communication, according to one embodiment.

FIG. 4 is a flowchart of a method 400 for enabling non-P2P communication to occur in parallel with P2P communication, according to one embodiment. At block 405, the AP assigns a RU to a non-P2P STA based on interference data received from polling the P2P STAs. That is, based on an effect the non-P2P STAs have when transmitting data on the P2P STAs, the AP can determine whether a RU can be assigned in the same trigger frame to the non-P2P STA. Referring again to FIG. 2, in that case, the AP determined that the STAs 110D and 110G are permitted to perform non-P2P communication in parallel with the P2P communication but that the STA 110C is not.

Moreover, the interference data can be used to adjust the power levels used by the non-P2P STAs when transmitting. That is, in addition to adjusting the data rates used by the transmitting P2P STAs to make the P2P communications more tolerant of interference, the AP can also lower the power levels used by the non-P2P STAs so they generate less interference at the receiving P2P STAs.

At block 410, the AP transmits a trigger frame that includes a RU for the non-P2P STA and a RU for the P2P STA. Doing so permits the non-P2P STA and the P2P STA to transmit data in parallel. In this manner, the wireless medium may be used more efficiently than assigning the RU only to the P2P STA even if the P2P STA transmits at a reduced data rate.

Figure 5:
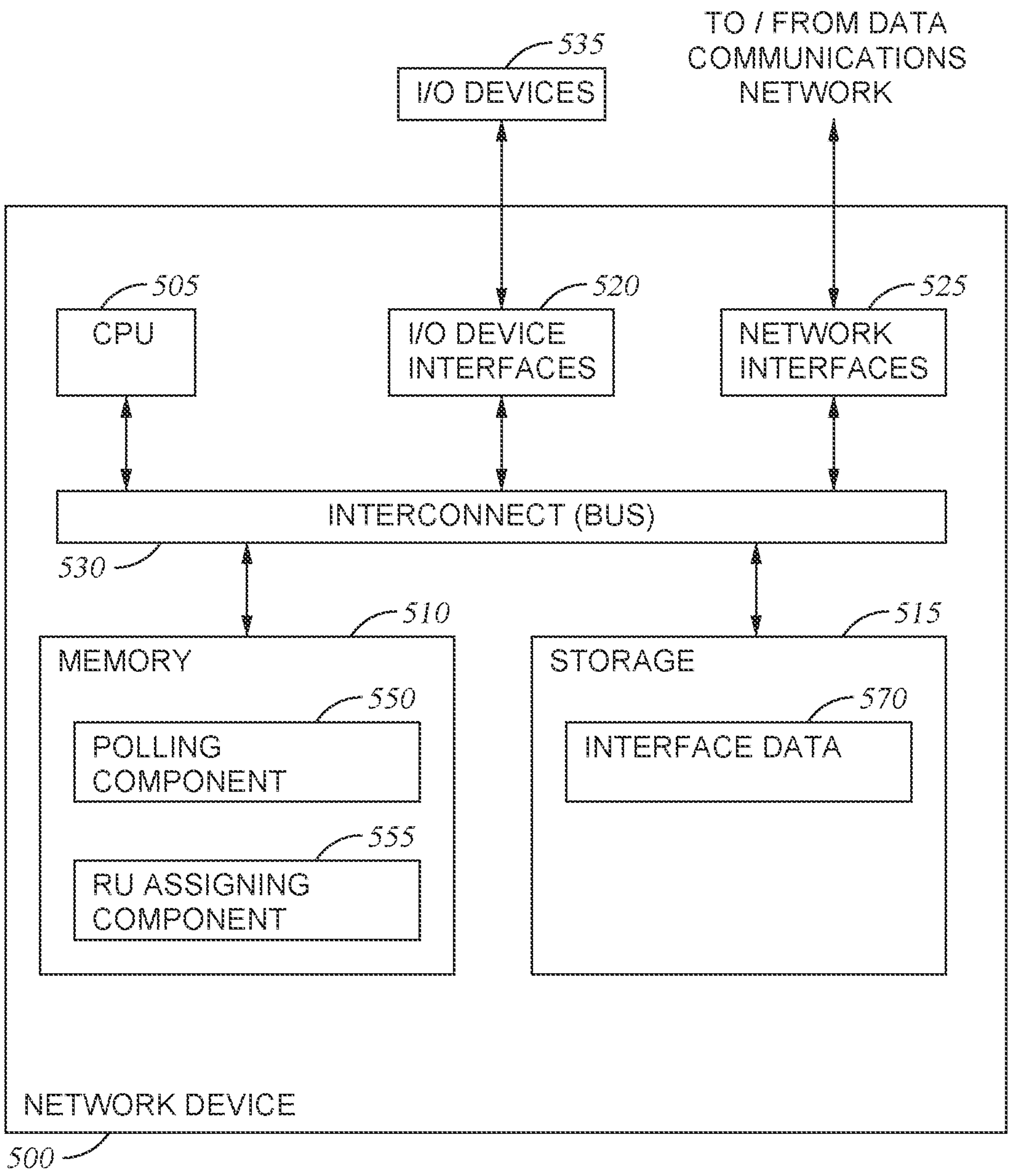
FIG. 5 is a block diagram of a network device, according to one embodiment.

FIG. 5 depicts an example computing device (e.g., a network device 500) configured to perform various aspects of the present disclosure, according to some embodiments of the present disclosure. In some embodiments, the network device 500 corresponds to an AP 105 of FIG. 1. Although depicted as a physical device, in embodiments, the network device 500 may be implemented using virtual device(s), and/or across a number of devices (e.g., in a cloud environment).

As illustrated, the network device 500 includes a CPU 505, memory 510, storage 515, a network interface 525, and one or more I/O interfaces 520. In the illustrated embodiment, the CPU 505 retrieves and executes programming instructions stored in memory 510, as well as stores and retrieves application data residing in storage 515. The CPU 505 is generally representative of a single CPU and/or GPU, multiple CPUs and/or GPUs, a single CPU and/or GPU having multiple processing cores, and the like. The memory 510 is generally included to be representative of a random access memory. Storage 515 may be any combination of disk drives, flash-based storage devices, and the like, and may include fixed and/or removable storage devices, such as fixed disk drives, removable memory cards, caches, optical storage, network attached storage (NAS), or storage area networks (SAN).

In some embodiments, I/O devices 535 (such as keyboards, monitors, etc.) are connected via the I/O interface(s) 520. Further, via the network interface 525, the network device 500 can be communicatively coupled with one or more other devices and components (e.g., via a network, which may include the Internet, local network(s), and the like). As illustrated, the CPU 505, memory 510, storage 515, network interface(s) 525, and I/O interface(s) 520 are communicatively coupled by one or more buses 530.

In the illustrated embodiment, the memory 510 includes a polling component 550 and a RU assigning component 555, which may perform one or more embodiments discussed above in, e.g., the methods 300 and 400. Although depicted as discrete components for conceptual clarity, in embodiments, the operations of the depicted components (and others not illustrated) may be combined or distributed across any number of components. Further, although depicted as software residing in memory 510, in embodiments, the operations of the depicted components (and others not illustrated) may be implemented using hardware, software, or a combination of hardware and software.

In one embodiment, the polling component 550 is used to poll the P2P STAs, as discussed above. For example, the polling component 550 may receive and aggregate the interference data to determine interference caused by other P2P and non-P2P STAs, and the like.

Generally, the RU assigning component 555 may be used to assign RUs to the STAs (whether those STAs are P2P STAs or non-P2P STAs), as discussed above. For example, the RU assigning component 555 may determine, for each P2P STA, whether it can be assigned a RU along with other P2P and non-P2P STAs in the same BSS, and if so, a data rate that should be used for P2P communication, as discussed above (e.g., based on the interference data 570 generated by the polling component 550).

In the illustrated example, the storage 515 includes the interference data 570. In some embodiments, the interference data 570 can include the individual interference data received from the various P2P STAs coupled to the network device 500. Although depicted as residing in storage 515, the interference data 570 may be stored in any suitable location, including memory 510.

In the current disclosure, reference is made to various embodiments. However, the scope of the present disclosure is not limited to specific described embodiments. Instead, any combination of the described features and elements, whether related to different embodiments or not, is contemplated to implement and practice contemplated embodiments. Additionally, when elements of the embodiments are described in the form of "at least one of A and B," or "at least one of A or B," it will be understood that embodiments including element A exclusively, including element B exclusively, and including element A and B are each contemplated. Furthermore, although some embodiments disclosed herein may achieve advantages over other possible solutions or over the prior art, whether or not a particular advantage is achieved by a given embodiment is not limiting of the scope of the present disclosure. Thus, the aspects, features, embodiments and advantages disclosed herein are merely illustrative and are not considered elements or limitations of the appended claims except where explicitly recited in a claim(s). Likewise, reference to “the invention” shall not be construed as a generalization of any inventive subject matter disclosed herein and shall not be considered to be an element or limitation of the appended claims except where explicitly recited in a claim(s).

As will be appreciated by one skilled in the art, the embodiments disclosed herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a “circuit,” “module” or “system.” Furthermore, embodiments may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the “C” programming language or similar programming languages. The program code may execute entirely on the user’s computer, partly on the user’s computer, as a stand-alone software package, partly on the user’s computer and partly on a remote computer or entirely on the remote computer or server. In the latter scenario, the remote computer may be connected to the user’s computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatuses (systems), and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations and/or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations and/or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations and/or block diagrams.

The flowchart illustrations and block diagrams in the Figures illustrate the architecture, functionality, and operation of possible implementations of systems, methods, and computer program products according to various embodiments. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

In view of the foregoing, the scope of the present disclosure is determined by the claims that follow.

We claim:

1. A method, comprising:

polling, using an access point (AP), a peer-to-peer (P2P) station associated with the AP for interference the P2P station hears from another station with a receive address (RA) that is in a same basic service set (BSS) as the AP;

receiving at the AP, in response to the polling, interference data from the P2P station indicating an amount of interference received at the P2P station caused by at least one other station in the same BSS the AP;

assigning, at the AP, a resource unit (RU) to the P2P station to perform P2P communication; and transmitting a trigger frame from the AP to the P2P station, the trigger frame comprising the RU and an indication of a data rate the P2P station should use when communicating during the RU, wherein the data rate is based on the interference data.

2. The method of claim 1, wherein the trigger frame comprises a second RU assigned to a first station associated with the AP, wherein the second RU indicates the first station is permitted to transmit data to the AP at a same time the P2P station performs P2P communication.

3. The method of claim 2, wherein the data rate for the P2P station is set so that interference caused by the first station transmitting data to the AP does not violate signal-to-noise (SNR) requirements of a second P2P station that is receiving data from the P2P station during the P2P communication.

4. The method of claim 1, wherein the trigger frame comprises a second RU assigned to a second P2P station associated with the AP, wherein the second RU indicates the second P2P station can perform P2P communication at a same time the P2P station performs P2P communication.

5. The method of claim 4, wherein the data rate for the P2P station is set so that interference caused by the second P2P station when performing P2P communication does not violate SNR requirements of a third P2P station that is receiving data from the P2P station during the P2P communication, wherein the trigger frame comprises an indication of a second data rate the second P2P station should use when communicating during the second RU, wherein the second data rate is set so that the interference caused by the P2P station when performing P2P communication does not violate SNR requirements of a fourth P2P station that receives data from the second P2P station during P2P communication.

6. The method of claim 1, wherein the trigger frame is an Ultra-High Reliability (UHR) trigger frame.

7. The method of claim 1, wherein the trigger frame comprises an indication that the P2P station should transmit data while a second P2P station should receive data during the RU.

8. The method of claim 1, further comprising:

synchronizing a local oscillator in the P2P station and a local oscillator in a receiving P2P station to the trigger frame.

9. The method of claim 1, wherein the trigger frame comprises a group ID assigned to the P2P station and a companion P2P station for receiving data during the RU, wherein the group ID replaces an association ID (AID) in the trigger frame.

10. An access point (AP), comprising:

a processor; and a memory storing an application configured to, when executed by the processor, perform an operation, the operation comprising:

polling, using an AP, a peer-to-peer (P2P) station associated with the AP, receiving, in response to the polling, interference data from the P2P station indicating an amount of interference received at the P2P station caused by at least one other station associated with the AP, assigning a resource unit (RU) to the P2P station to perform P2P communication, and transmitting a trigger frame from the AP to the P2P station, the trigger frame comprising the RU and an indication of a data rate the P2P station should use when communicating during the RU, wherein the data rate is based on the interference data, wherein the trigger frame comprises a second RU assigned to a first station associated with the AP, wherein the second RU indicates the first station is permitted to transmit data to the AP at a same time the P2P station performs P2P communication, wherein the data rate for the P2P station is set so that interference caused by the first station transmitting data to the AP does not violate signal-to-noise (SNR) requirements of a second P2P station that is receiving data from the P2P station during the P2P communication.

11. The AP of claim 10, wherein the trigger frame comprises a third RU assigned to a second P2P station associated with the AP, wherein the third RU indicates the second P2P station can perform P2P communication at a same time the P2P station performs P2P communication.

12. The AP of claim 11, wherein the data rate for the P2P station is set so that interference caused by the second P2P station when performing P2P communication does not violate SNR requirements of a third P2P station that is receiving data from the P2P station during the P2P communication, wherein the trigger frame comprises an indication of a second data rate the second P2P station should use when communicating during the third RU, wherein the second data rate is set so that the interference caused by the P2P station when performing P2P communication does not violate SNR requirements of a fourth P2P station that receives data from the second P2P station during P2P communication.

13. The AP of claim 10, wherein the trigger frame is an Ultra-High Reliability (UHR) trigger frame.

14. The AP of claim 10, wherein the trigger frame comprises an indication that the P2P station should transmit data while a second P2P station should receive data during the RU.

15. The AP of claim 10, wherein the operation further comprises:

synchronizing a local oscillator in the P2P station and a local oscillator in a receiving P2P station to the trigger frame.

16. The AP of claim 10, wherein the trigger frame comprises a group ID assigned to the P2P station and a companion P2P station for receiving data during the RU.

17. A non-transitory computer readable medium, comprising:

computer readable program code which, when executed by a processor, performs an operation, the operation comprising:

polling, using an access point (AP), a peer-to-peer (P2P) station associated with the AP for interference the P2P station hears from another station with a receive address (RA) that is in a same basic service set (BSS) as the AP;

receiving at the AP, in response to the polling, interference data from the P2P station indicating an amount of interference received at the P2P station caused by at least one other station in the same BSS as the AP;

assigning, at the AP, a resource unit (RU) to the P2P station to perform P2P communication; and transmitting a trigger frame from the AP to the P2P station, the trigger frame comprising the RU and an indication of a data rate the P2P station should use when communicating during the RU, wherein the data rate is based on the interference data.

18. The non-transitory computer readable medium of claim 17, wherein the trigger frame comprises a second RU assigned to a first station associated with the AP, wherein the second RU indicates the first station is permitted to transmit data to the AP at a same time the P2P station performs P2P communication.

* * * * *